United States Patent
Klein

(10) Patent No.: US 8,069,300 B2
(45) Date of Patent: Nov. 29, 2011

(54) SOLID STATE STORAGE DEVICE CONTROLLER WITH EXPANSION MODE

(75) Inventor: Dean Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 669 days.

(21) Appl. No.: 12/241,794

(22) Filed: Sep. 30, 2008

(65) Prior Publication Data

US 2010/0082881 A1  Apr. 1, 2010

(51) Int. Cl.
*G06F 12/00* (2006.01)
(52) U.S. Cl. .............................. 711/103; 711/2; 711/154
(58) Field of Classification Search .............. 711/2, 103, 711/154
See application file for complete search history.

(56) References Cited

U.S. PATENT DOCUMENTS

| | | |
|---|---|---|
| 2004/0024916 A1 | 2/2004 | Hsing |
| 2006/0190642 A1 | 8/2006 | Aldereguia et al. |
| 2007/0245076 A1* | 10/2007 | Chang et al. ................... 711/112 |
| 2008/0082731 A1 | 4/2008 | Karamcheti et al. |
| 2009/0024819 A1* | 1/2009 | Fisher et al. ................... 711/170 |
| 2009/0063757 A1* | 3/2009 | Norman ....................... 711/103 |
| 2009/0164722 A1* | 6/2009 | Lee et al. ...................... 711/115 |

FOREIGN PATENT DOCUMENTS

WO   WO 2008/086488   7/2008

* cited by examiner

*Primary Examiner* — John Lane
(74) *Attorney, Agent, or Firm* — Leffert Jay & Polglaze, P.A.

(57) ABSTRACT

Solid state storage device controllers, solid state storage devices, and methods for operation of solid state storage device controllers are disclosed. In one such solid state storage device, the controller can operate in either an expansion DRAM mode or a non-volatile memory mode. In the DRAM expansion mode, one or more of the memory communication channels normally used to communicate with non-volatile memory devices is used to communicate with an expansion DRAM device.

15 Claims, 11 Drawing Sheets

| ADDRESSES IN DRAM | ADDRESSES IN PRIMARY DRAM | ADDRESSES IN EXPANSION DRAM |
| --- | --- | --- |
| FFFFH | FFF ... FFEH | FFF ... FFFH |
| FFFEH | FFF ... FFCH | FFF ... FFDH |
| ... | ... | ... |
| 0003H | 000 ... 006H | 000 ... 007H |
| 0002H | 000 ... 004H | 000 ... 005H |
| 0001H | 000 ... 002H | 000 ... 003H |
| 0000H | 000 ... 000H | 000 ... 001H |
| IN 16-BIT MODE | IN 32-BIT EXPANSION MODE | |

FIG. 9

SOLID STATE STORAGE DEVICE CONTROLLER WITH EXPANSION MODE

TECHNICAL FIELD OF THE INVENTION

The present invention relates generally to memory devices and in a particular embodiment the present invention relates to non-volatile memory devices and dynamic random access memory devices.

BACKGROUND OF THE INVENTION

Memory devices can include internal, semiconductor, integrated circuits in computers or other electronic devices. There are many different types of memory including random-access memory (RAM), read only memory (ROM), dynamic random access memory (DRAM), static RAM (SRAM), synchronous dynamic RAM (SDRAM), and non-volatile memory.

Non-volatile memory devices (e.g., flash memory) have developed into a popular source of non-volatile memory for a wide range of electronic applications. Flash memory devices typically use a one-transistor memory cell that allows for high memory densities, high reliability, and low power consumption. Common uses for flash memory include personal computers, personal digital assistants (PDAs), digital cameras, and cellular telephones. Program code and system data such as a basic input/output system (BIOS) are typically stored in flash memory devices for use in personal computer systems.

Non-volatile memory devices are also incorporated into solid state storage devices such as solid state drives. Solid state drives can be used in computers to replace the hard disk drives that typically have used magnetic or optical disks for storing large amounts of data. A solid state drive does not use moving parts whereas a hard disk drive requires a complex and sensitive drive and read/write head assembly to interact with the magnetic/optical disk. Thus, the solid state drives are more resistant to damage and loss of data through vibration and impacts.

One drawback to current solid state drive technology is achieving the memory density necessary to adequately and cost effectively replace a computer's hard disk drive. Most modern computers require the capability for storing very large amounts of data (e.g., 250 GB or more) due to digital images, movies, and audio files. Thus, an effective solid state drive should have a memory density approaching a typical hard drive, remain cost competitive, and still fit within the constantly decreasing thickness of a laptop computer, for example.

FIG. 1 illustrates one typical prior art solid state drive with four channels between a controller and the memory devices and no DRAM buffer. A memory communication channel 110 is comprised of the address, data, and control signal lines for a group of memory devices 101-104. In this example, each channel is coupled to four stacked memory devices 101-104 that is connected to the controller 100.

In order to increase the performance of solid state drives, DRAM has been incorporated into the drives. FIG. 2 illustrates a block diagram of a typical prior art solid state drive that incorporates a DRAM device 200 for storage of temporary data. The drive of FIG. 2 shows an eight channel controller 230 in which the eight channels 201-208 are each connected to four memory devices. The DRAM device 200 is connected to the controller 230 over dedicated data 220 and address/command 221 buses.

Since DRAM has an access time that is substantially less than non-volatile memory, the DRAM can be used to maintain translation tables and buffers that would normally be done by the slower non-volatile memory. However, the size of the DRAM is limited by the number of address and data lines available on the controller 230. Memory controllers, in order to save space on the controller, typically have a small quantity of address/data signal lines. Thus only a relatively low density DRAM can be connected to the controller. If the translation tables and other temporary data requiring DRAM requires more memory, the controller will use non-volatile memory. This impacts the performance of the solid state drive since the non-volatile memory tends to be slower in both reading and writing of data.

For the reasons stated above, and for other reasons stated below that will become apparent to those skilled in the art upon reading and understanding the present specification, there is a need in the art for a way to control both non-volatile and volatile memory in a solid state storage device while using larger volatile memory devices.

BRIEF DESCRIPTION OF THE DRAWINGS

FIG. 9 shows DRAM address maps in accordance with the embodiment of FIG. 8.

DETAILED DESCRIPTION

Figure 1:
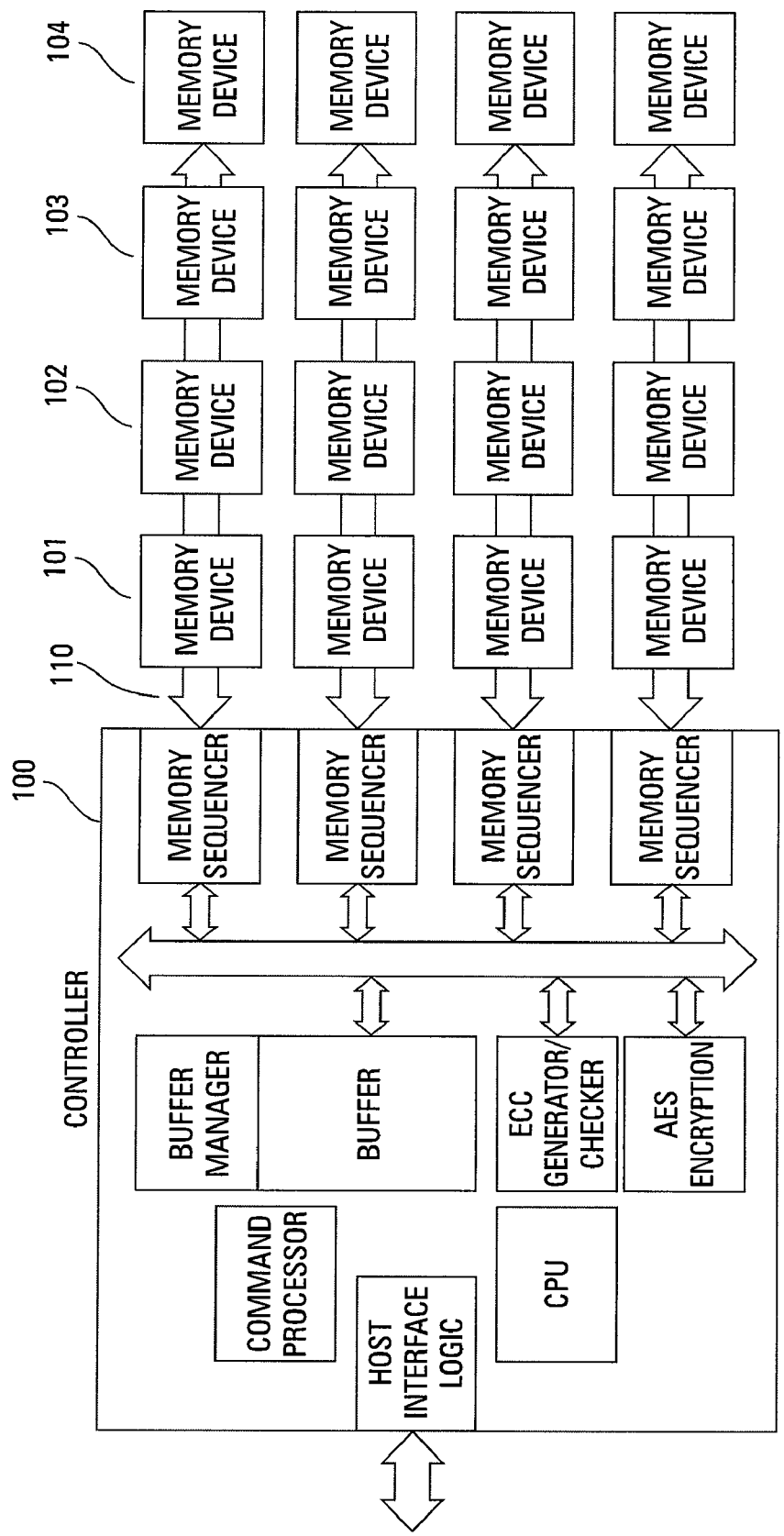
FIG. 1 shows a typical prior art solid state drive without a DRAM buffer.
Figure 2:
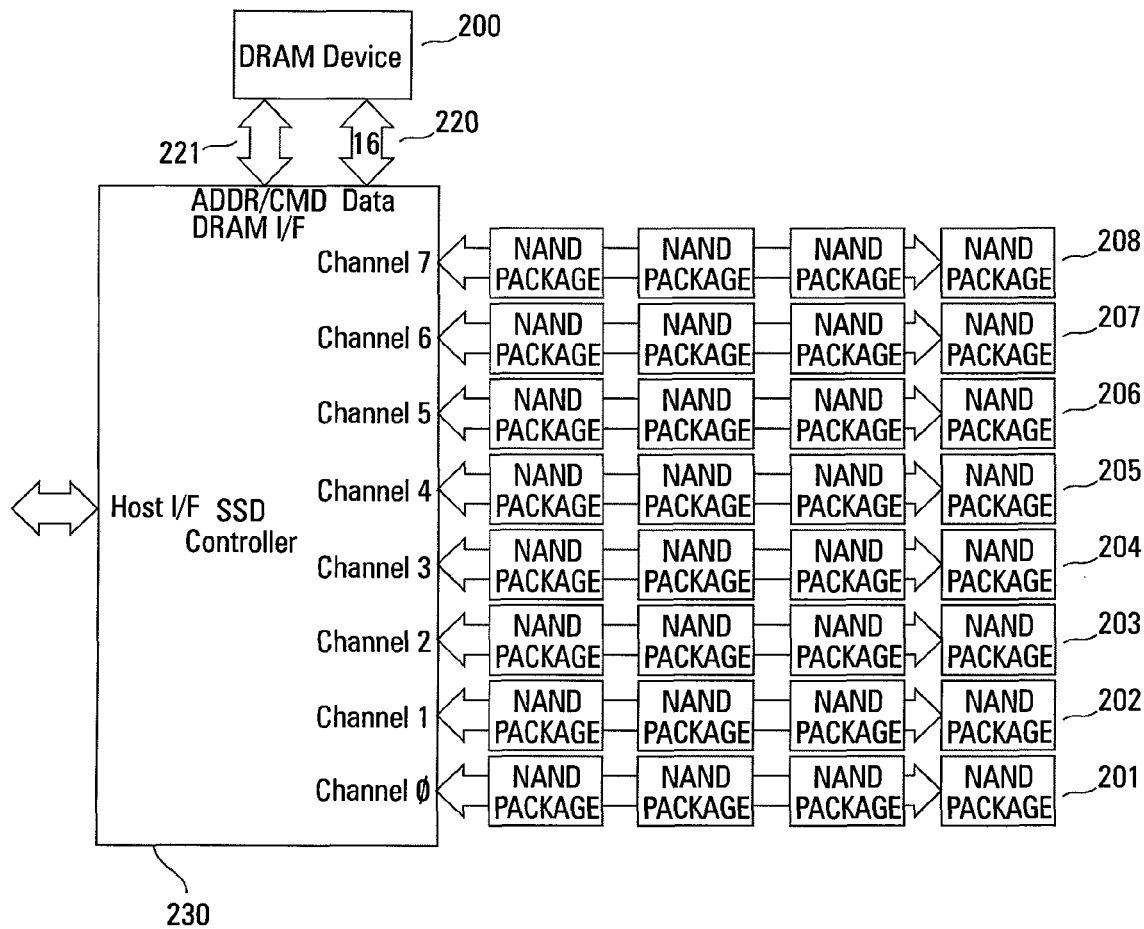
FIG. 2 shows a typical prior art solid state drive with a DRAM buffer.

In the following detailed description of the invention, reference is made to the accompanying drawings that form a part hereof and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

Figure 3:
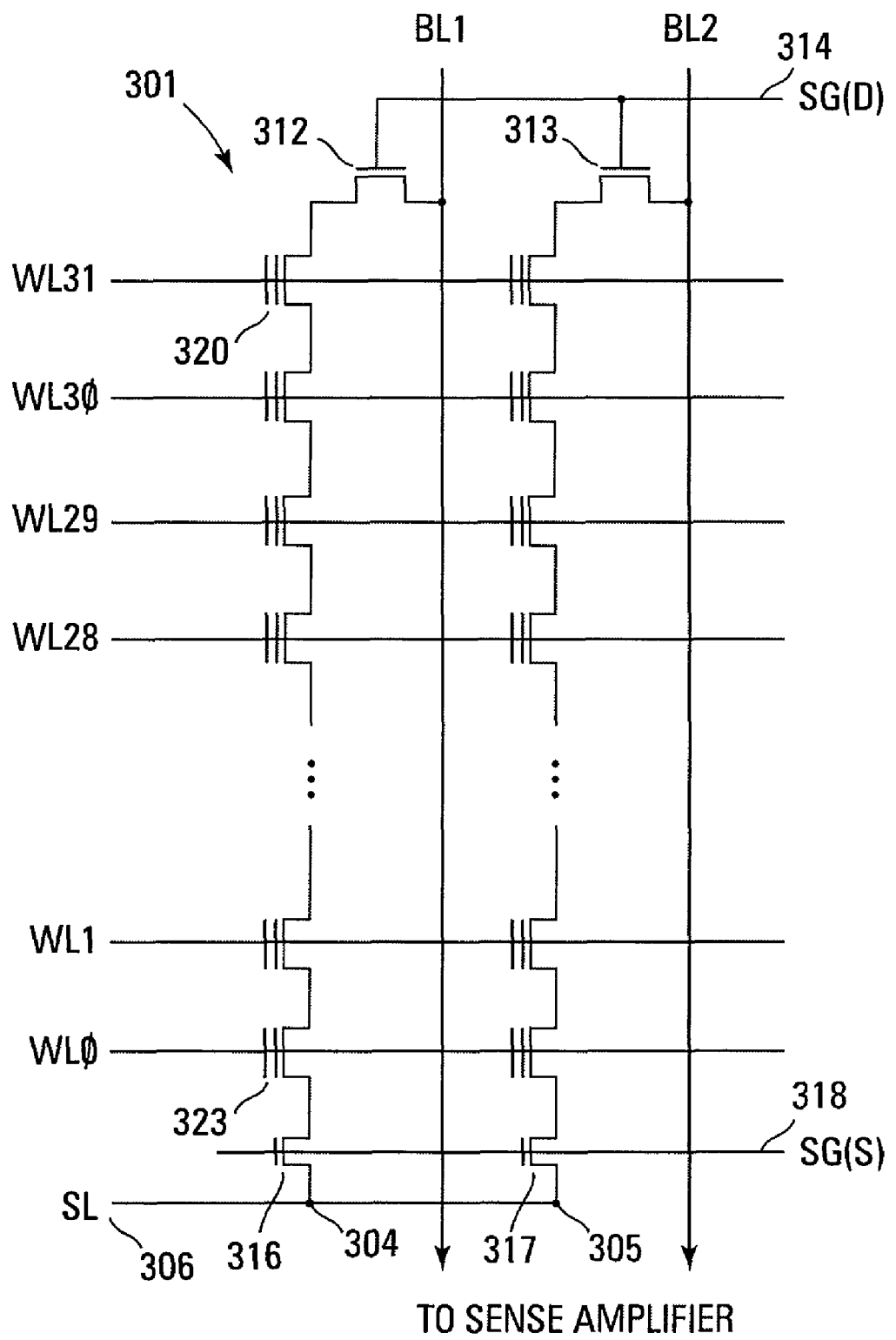
FIG. 3 shows a schematic diagram of one embodiment of a portion of a non-volatile memory array in accordance with the non-volatile memory device of FIG. 4.

FIG. 3 illustrates a schematic diagram of a portion of a NAND architecture memory array comprising series strings of non-volatile memory cells. While the subsequent discussions refer to a NAND memory device, the present embodiments are not limited to such an architecture. Alternate embodiments can use other memory architectures with the memory controller having the DRAM expansion mode.

The memory array is comprised of an array of non-volatile memory cells 301 (e.g., floating gate) arranged in columns such as series strings 304, 305. Each of the cells 301 are coupled drain to source in each series string 304, 305. An access line (e.g. word line) WL0-WL31 that spans across multiple series strings 304, 305 is connected to the control gates of each memory cell in a row in order to bias the control gates of the memory cells in the row. Data lines, such as bit lines BL1, BL2 are eventually connected to sense amplifiers (not shown) that detect the state of each cell by sensing current on a particular bit line.

Each series string 304, 305 of memory cells is coupled to a source line 306 by a source select gate 316, 317 and to an individual bit line BL1, BL2 by a drain select gate 312, 313. The source select gates 316, 317 are controlled by a source select gate control line SG(S) 318 coupled to their control gates. The drain select gates 312, 313 are controlled by a drain select gate control line SG(D) 314.

Each memory cell can be programmed as a single level cell (SLC) or multilevel cell (MLC). Each cell's threshold voltage ($V_t$) is indicative of the data that is stored in the cell. For example, in an SLC, a $V_t$ of 0.5V might indicate a programmed cell while a $V_t$ of −0.5V might indicate an erased cell. The MLC may have multiple $V_t$ windows that each indicate a different state. Multilevel cells can take advantage of the analog nature of a traditional flash cell by assigning a bit pattern to a specific voltage range stored on the cell. This technology permits the storage of two or more bits per cell, depending on the quantity of voltage ranges assigned to the cell.

Figure 4:
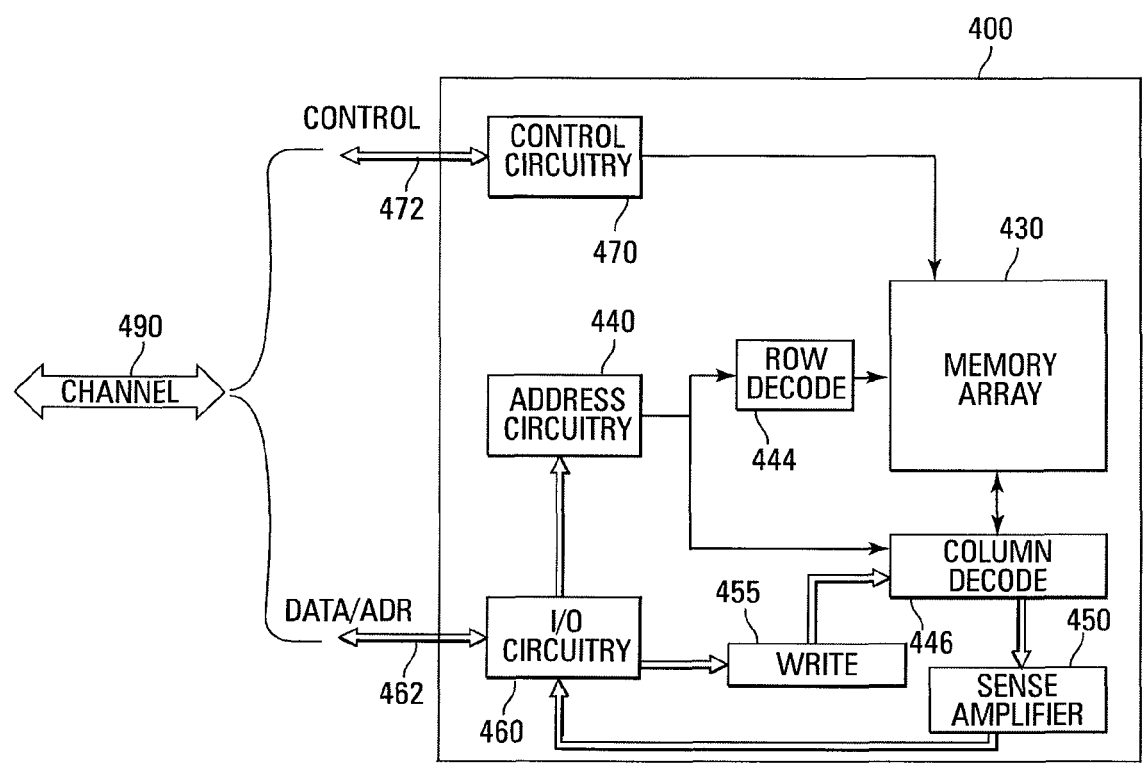
FIG. 4 shows a block diagram of one embodiment of a non-volatile memory device that incorporates the memory array of FIG. 3 and uses a memory communication channel.

FIG. 4 illustrates a functional block diagram of a non-volatile memory device 400 that can be incorporated on an integrated circuit die. The non-volatile memory device 400, in one embodiment, is flash memory. The non-volatile memory device 400 has been simplified to focus on features of the memory that are helpful in understanding the present programming embodiments.

The non-volatile memory device 400 includes an array 430 of non-volatile memory cells such as the floating gate memory cells that are illustrated in FIG. 3 and discussed previously. The memory array 430 is arranged in banks of word line rows and bit line columns. In one embodiment, the columns of the memory array 430 are comprised of series strings of memory cells. As is well known in the art, the connections of the cells to the bit lines determines whether the array is a NAND architecture, an AND architecture, or a NOR architecture.

The memory array 430 can be organized into memory blocks. The quantity of memory blocks is typically determined by the size of the memory device (i.e., 512 MB, 1 GB). In one embodiment, each memory block is organized into 64 pages.

Address buffer circuitry 440 is provided to latch address signals provided through the I/O circuitry 460. Address signals are received and decoded by a row decoder 444 and a column decoder 446 to access the memory array 430. It will be appreciated by those skilled in the art, with the benefit of the present description, that the number of address input connections depends on the density and architecture of the memory array 430. That is, the number of addresses increases with both increased memory cell counts and increased bank and block counts. Data is also input and output through the I/O circuitry 460 based on the timing of the control signals 472.

The non-volatile memory device 400 reads data in the memory array 430 by sensing voltage or current changes in the memory array columns using sense amplifier circuitry 450. The sense amplifier circuitry 450, in one embodiment, is coupled to read and latch a row of data from the memory array 430. Data input and output buffer circuitry 460 is included for bidirectional data communication as well as address communication over a plurality of data connections 462 with an external controller. Write circuitry 455 is provided to write data to the memory array.

The memory control circuitry 470 decodes signals provided on control bus 472 from an external controller. These signals can include read/write (R/W), chip enable (CE), command latch enable (CLE), address latch enable (ALE) as well as other control signals that are used to control the operations on the memory array 430 as well as other circuitry of the memory device 400. In one embodiment, these signals are active low but alternate embodiments can use active high signals. The memory control circuitry 470 may be a state machine, a sequencer, or some other type of controller to generate the memory control signals.

The non-volatile memory device 400 communicates with an external controller over a channel 490. In one embodiment, the channel 490 is comprised of the memory address, data, and control signals between the external controller and the memory device 400. The embodiment of FIG. 4 shows the address and data being coupled as one bus to the I/O circuitry 460. In an alternate embodiment, the address and data buses are separate inputs/outputs with the memory device 400.

Figure 5:
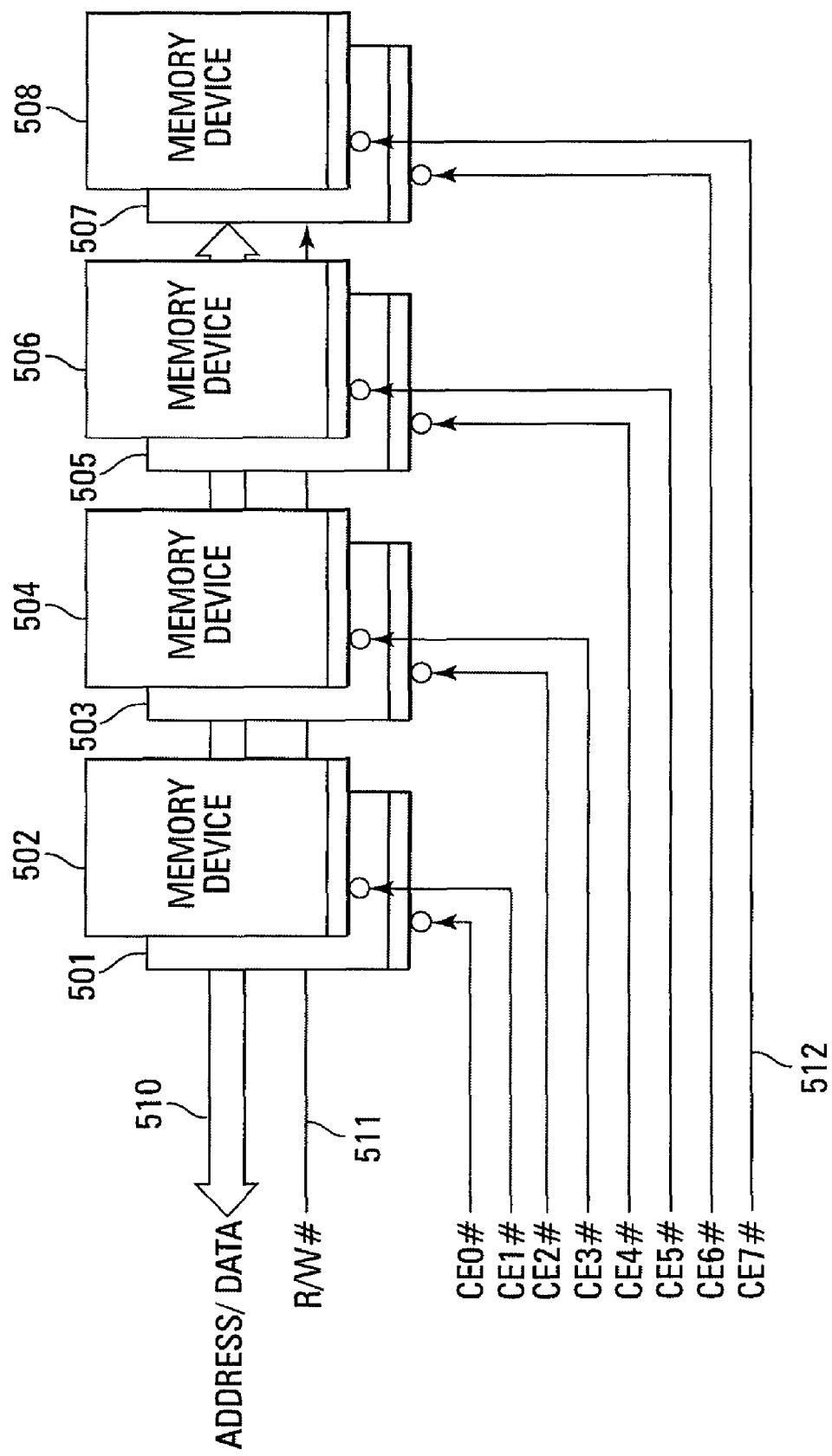
FIG. 5 shows a block diagram of one embodiment of a memory communication channel coupled to a plurality of memory devices.

FIG. 5 illustrates a block diagram of one embodiment of a plurality of memory devices 501-508 that can make up one or more communication channels in a solid state storage device. This figure shows the address/data bus 510, Read/Write control signal 511, and chip enable signals 512 that make up the one or more communication channels. The illustrated embodiment includes eight separate memory devices so that eight chip enable signals ($\overline{CE0}$-$\overline{CE7}$) are used. Each memory device 501-508 is formed on a separate die and stacked with one or more of the other memory devices to form the solid state storage device.

The embodiment of FIG. 5 is for purposes of illustration only. A solid state storage device may use only one memory device 501 or multiple memory devices. For example, a solid state storage device could be comprised of a plurality of non-volatile memory devices organized into groups of non-volatile memory devices 501, 502 in which each group of non-volatile memory devices share a common communication channel including a single chip enable line. Each of the plurality of non-volatile memory communication channels is coupled to a different group of non-volatile memory devices.

Figure 6:
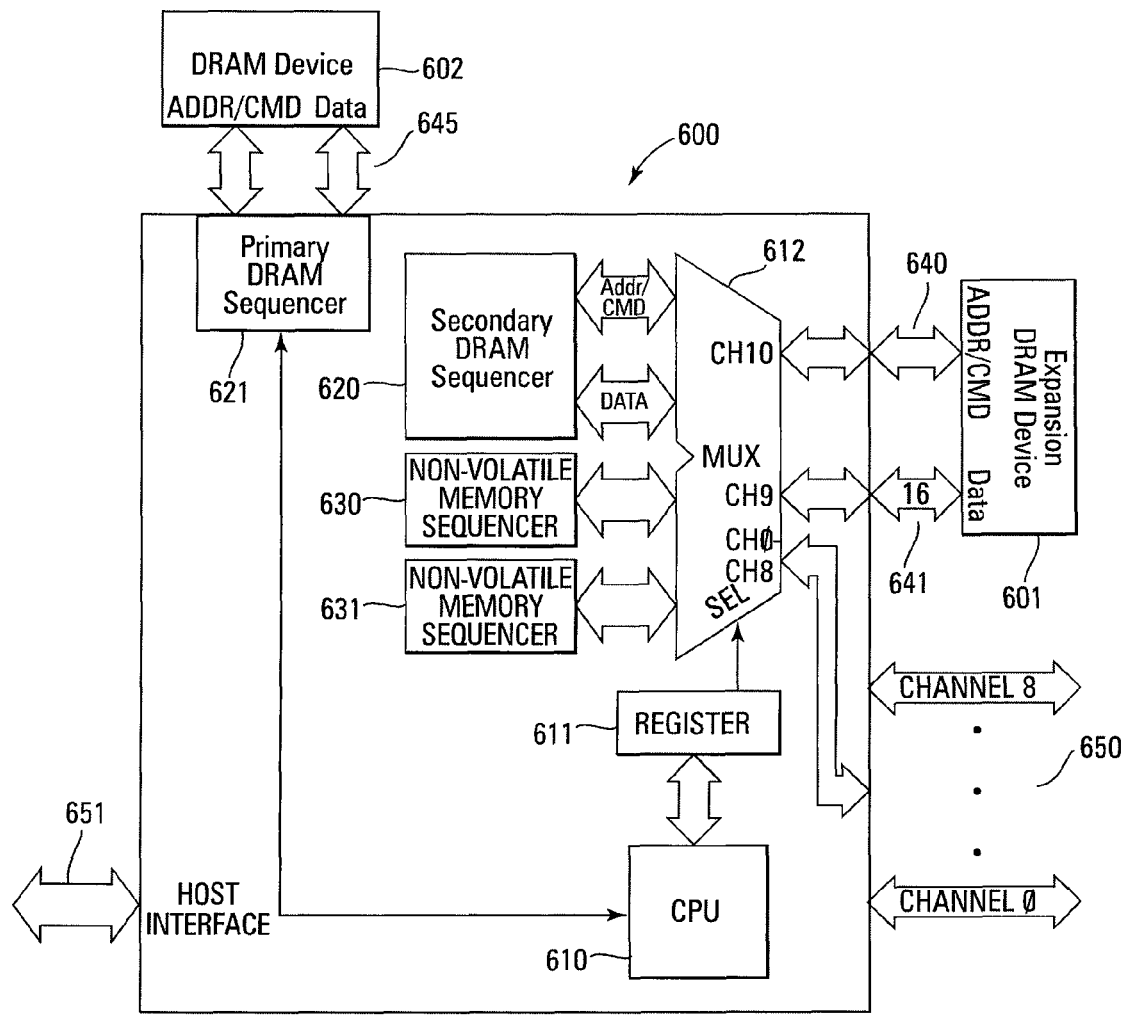
FIG. 6 shows a logical representation of one embodiment of a solid state storage device controller having a DRAM expansion mode with two non-volatile memory channels dedicated to DRAM expansion.

FIG. 6 illustrates a block diagram of one embodiment of a solid state storage device controller operating in a DRAM expansion mode with two non-volatile memory channels dedicated to DRAM expansion. The subsequent discussion refers to a DRAM. However, one skilled in the art would realize that any memory device other than NAND flash could be substituted for the DRAM and still remain within the scope of the disclosed embodiments. Such a memory device should be capable of fast, random access and may be of a volatile or a non-volatile type. A slower memory device typically has a slower access time than the faster memory device.

In this embodiment, two of the controller's memory communication channels 640, 641, normally used for communication with the non-volatile memories, are instead used to communicate with an expansion DRAM bank 601 that is separate and independent from the primary DRAM bank 602. This provides improved bandwidth as well as additional performance due to the locality of many of the DRAM operations now having twice as many DRAM pages.

Referring to FIG. 6, the solid state storage device memory controller 600 is comprised of a memory control circuit, such as primary DRAM sequencer 621 that couples the primary DRAM device 602 to the controller 600. The DRAM device 602 communicates with the primary DRAM sequencer 621 over data and address/control buses 645.

The primary DRAM sequencer 621 is a DRAM control circuit that is responsible for generating the timing and commands necessary for operation of the memory device 602. For example, the primary DRAM sequencer 621 can generate the read/write control signals as well as the refresh signals necessary for proper DRAM operation.

A secondary DRAM sequencer 620 is used for essentially the same functions as the primary DRAM sequencer 621. However, the secondary DRAM sequencer 620 is responsible for generating the control signals necessary for proper operation of the expansion DRAM device 601.

Two of the non-volatile memory sequencers 630, 631 are shown coupled to a multiplexer 612. The non-volatile memory sequencers 630, 631 are non-volatile memory control circuits that generate the timing and commands necessary for operation of the non-volatile memory devices. The non-volatile memory sequencers 603 control an access process to write and/or read the memory devices on each memory communication channel 650. For example, the non-volatile memory sequencers 630, 631 can generate the control signals that control the select gate drain and select gate source transistors as described with reference to FIG. 3. The non-volatile memory sequencers 630, 631 may also be responsible for generating many other memory control signals.

Two non-volatile memory sequencers 630, 631 are shown in FIG. 6. Alternate embodiments may use other quantities of non-volatile memory sequencers. For example, one embodiment might use only one sequencer. Another embodiment could use a different non-volatile memory sequencer for each different memory communication channel 650.

The multiplexer 612, in response to a select signal, is responsible for selecting which of the circuits attached to its inputs are output to the various memory communication channels 640, 641, 650 of the solid state storage device controller 600. The select signal is generated by a CPU 610 that stores a select signal (e.g., bit or bits) in a register 611. The CPU 610 generates the select signal in response to data input over the host interface. For example, if an access is made by an external system to one of the memory communication channels 650 with the non-volatile memory, the CPU generates and stores a select signal that selects the appropriate channel 650 through the multiplexer 612. If the CPU is executing an algorithm that requires updating translation tables that are stored in the expansion DRAM device 601, the CPU 610 generates and stores a select signal that causes the multiplexer 612 to select the secondary DRAM sequencer 620 to be output so that the expansion DRAM device 601 can be accessed.

The controller 600 is additionally configured with a host interface 651 over which the controller 600 communicates with external devices/systems such as computers and cameras. The host interface 651 can be parallel ATA, SATA, SAS, PCIe, Fiber Channel, SCSI, Gigabit Ethernet, or some other communication standard.

The expansion DRAM device 601 is coupled to the controller 600 over two of the communication channels 640, 641 that are normally used for communication with the non-volatile memory devices. The two channels 640, 641 are coupled to the address/command bus 640 and the data bus 641 of the DRAM device 601.

If the expansion DRAM device 601 is present, it is used to store additional translation tables and for additional data buffering. Typical uses for the primary DRAM and the expansion DRAM include: transfer from non-volatile memory to DRAM during a solid state storage device read operation, transfer from DRAM to non-volatile memory on a solid state storage device write operation, error correction operations on read data, translation table read (allowing a logical drive address to map to any physical non-volatile memory address), data collection read operation from non-volatile memory, data collection write operation to non-volatile memory, static wear-leveling, translation table update due to data collection operations or static wear-leveling, and translation table write operations to non-volatile memory. These are only an illustration of the possible functions that use the primary and expansion DRAMs.

The above-described elements of the solid state storage device memory controller of FIG. 6 are a logical representation of the functions performed by the controller. These elements are not necessarily required for proper operation of the controller. Alternate embodiments may use other elements to perform substantially the same functions. Additionally, for purposes of clarity, not all elements of the memory controller are shown. Only those elements related to proper operation of the disclosed embodiments are shown and discussed.

Figure 7:
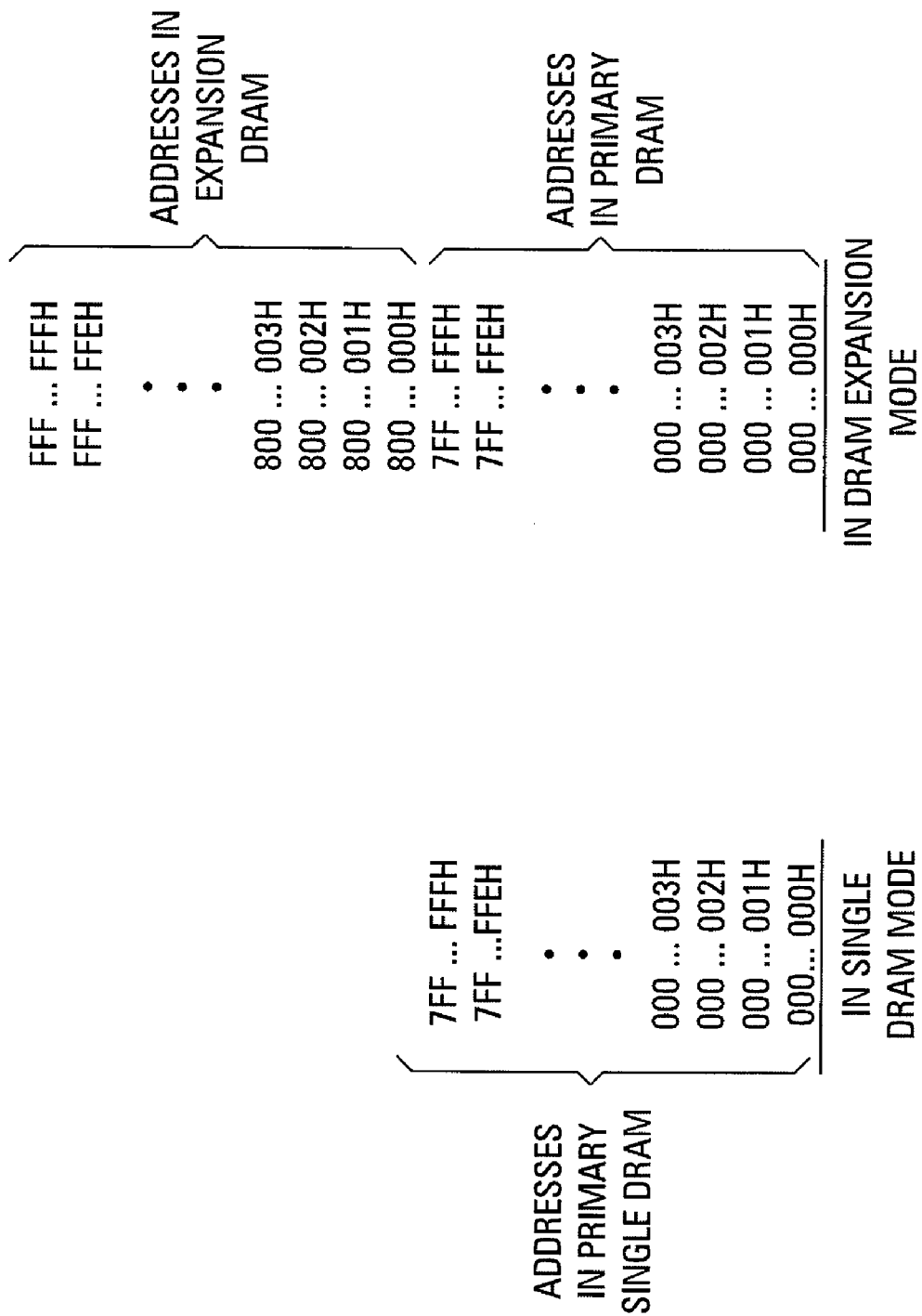
FIG. 7 shows DRAM address maps in accordance with the embodiment of FIG. 6.

FIG. 7 illustrates two memory address maps for use with the embodiment of FIG. 6. This memory map shows how the DRAM addresses are split between the two DRAM devices 601, 602 of FIG. 6. These addresses are generated by the primary sequencer 621 and secondary sequencer 620 in combination with the CPU 610 of the controller 600.

FIG. 7 shows that if the controller 600 is not in the DRAM expansion mode, only the single primary DRAM device 602 is used. Thus the memory map for the primary DRAM device 602 is in the range of 00000000H to 70000000H (32 address bits). In the DRAM expansion mode, the addresses 00000000H to 7FFFFFFFH are used to address the primary DRAM 602 while 80000000H to FFFFFFFFH are used to address the expansion DRAM device 601.

The address maps of FIG. 7 are for purposes of illustration only. If different size primary and/or expansion DRAM devices are used, the address map will be comprised of different addresses. Also, the addresses for each DRAM can start in different locations than 00000000H or 80000000H.

Figure 8:
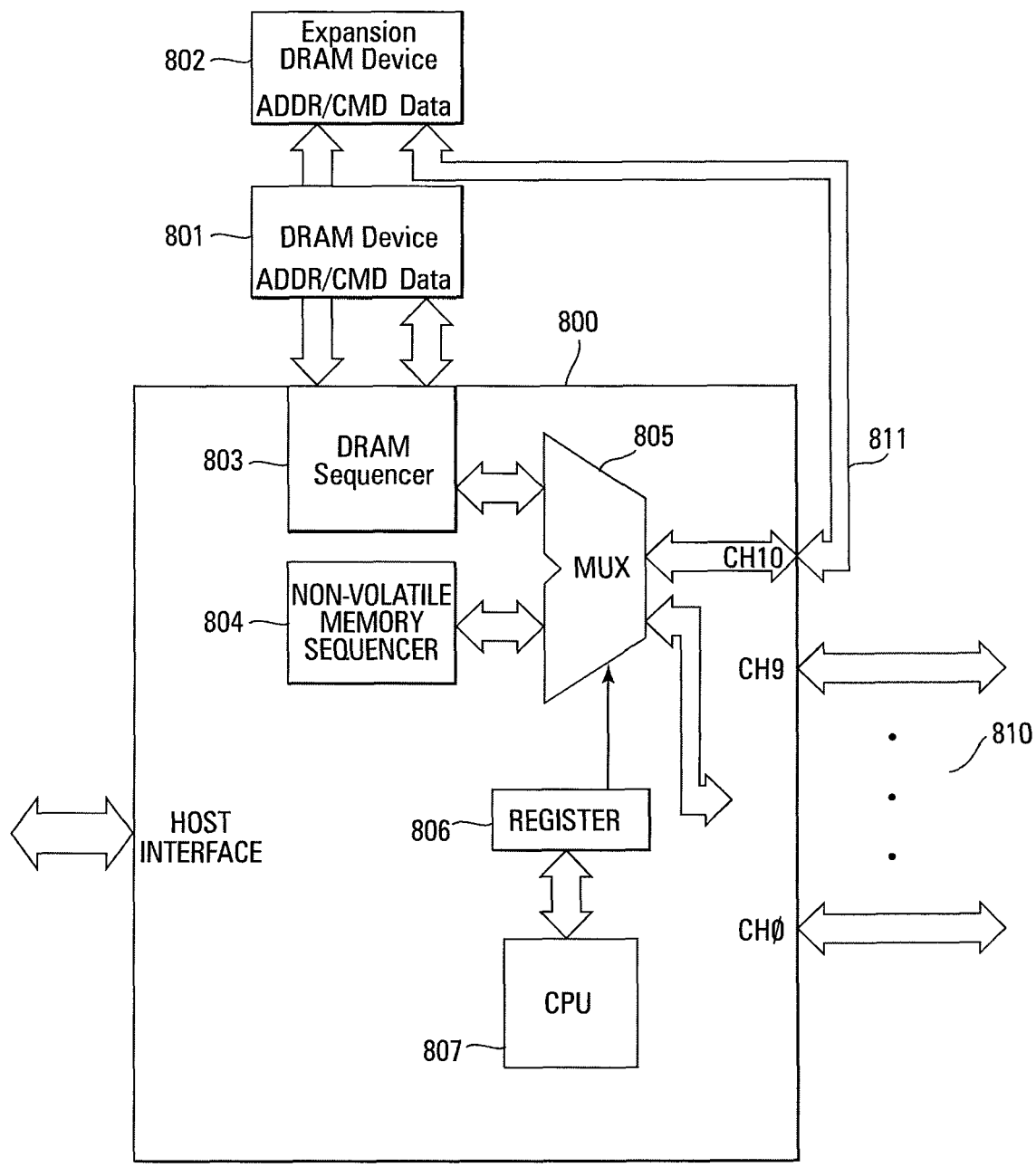
FIG. 8 shows a logical representation of an alternate embodiment of a solid state storage device controller having a DRAM expansion mode with a single non-volatile memory channel dedicated to DRAM expansion.

FIG. 8 illustrates an alternate embodiment of a solid state storage device controller 800 having a DRAM expansion mode with a single non-volatile memory channel 811 dedicated to DRAM expansion. The width of the communication channel 811 for the expansion DRAM is sufficient to expand the data bus to a width of 32 bits.

The solid state storage device controller 800 of FIG. 8 is comprised of a DRAM sequencer 803 that is responsible for generating the control signals for both the primary DRAM device 801 and the expansion DRAM device 802. As discussed previously, the sequencer 803 generates the necessary read, write, and refresh control signals for proper operation of a DRAM device.

A non-volatile memory sequencer 804 generates the non-volatile memory control signals to write and/or read the memory devices on each memory communications channel 810 that is coupled to at least one non-volatile memory device. For example, the non-volatile memory sequencer 804 can generate the control signals that control the select gate drain and select gate source transistors as described with reference to FIG. 3. The non-volatile memory sequencer 804 may also be responsible for generating many other non-volatile memory control signals.

Both the DRAM sequencer 803 and the non-volatile memory sequencer 804 are input to a multiplexer 805 that selects between the two sequencers 803, 804 in response to the select signal. As in the previous embodiment of FIG. 6, the CPU 807 generates the select signal that is then stored in the register 806. If an input data signal is to be stored in one of the non-volatile memories coupled to one of the non-volatile memory communication channels 810, the CPU 807 generates a select signal that selects the non-volatile memory sequencer 804 to be output by the multiplexer 805. If the CPU 807 requires the use of the expansion DRAM, the CPU 807 generates the select signal that selects the memory communication channel (e.g., Channel 10) 811 that is coupled to the expansion DRAM data bus.

In the embodiment of FIG. 8, both DRAM devices 801, 802 are exposed to the same addresses and commands. Each DRAM would have a write mask that enabled it to differentiate between addresses and commands meant for the other device 801, 802. This embodiment could also use data steering logic (not shown) to take advantage of the wider data bus. The least significant address bit would then be used to select the upper or lower 16-bit portions of the DRAM data bus. The remaining address bits coming into the DRAM sequencer would be shifted down one.

The above-described elements of the solid state storage device memory controller of FIG. 8 are a logical representation of the functions performed by the controller. These elements are not necessarily required for proper operation of the controller. Alternate embodiments may use other elements to perform substantially the same functions. Additionally, for purposes of clarity, not all elements of the memory controller are shown. Only those elements related to proper operation of the disclosed embodiments are shown and discussed.

FIG. 9 illustrates DRAM address maps in accordance with the embodiment of FIG. 8. When only the primary DRAM device 801 of FIG. 8 is used, the controller 800 is in the 16-bit mode so that addresses 0000H to FFFFH are used. If the controller is in the DRAM expansion mode, the addresses in the primary DRAM device use even addresses 00000000H to FFFFFFFEH while the expansion DRAM device uses odd addresses 00000001H to FFFFFFFFH.

The address maps of FIG. 9 are for purposes of illustration only. If different size primary and/or expansion DRAM devices are used, the address maps will be comprised of different addresses. Also, the addresses for each DRAM can start in different locations than 00000000H.

Figure 10:
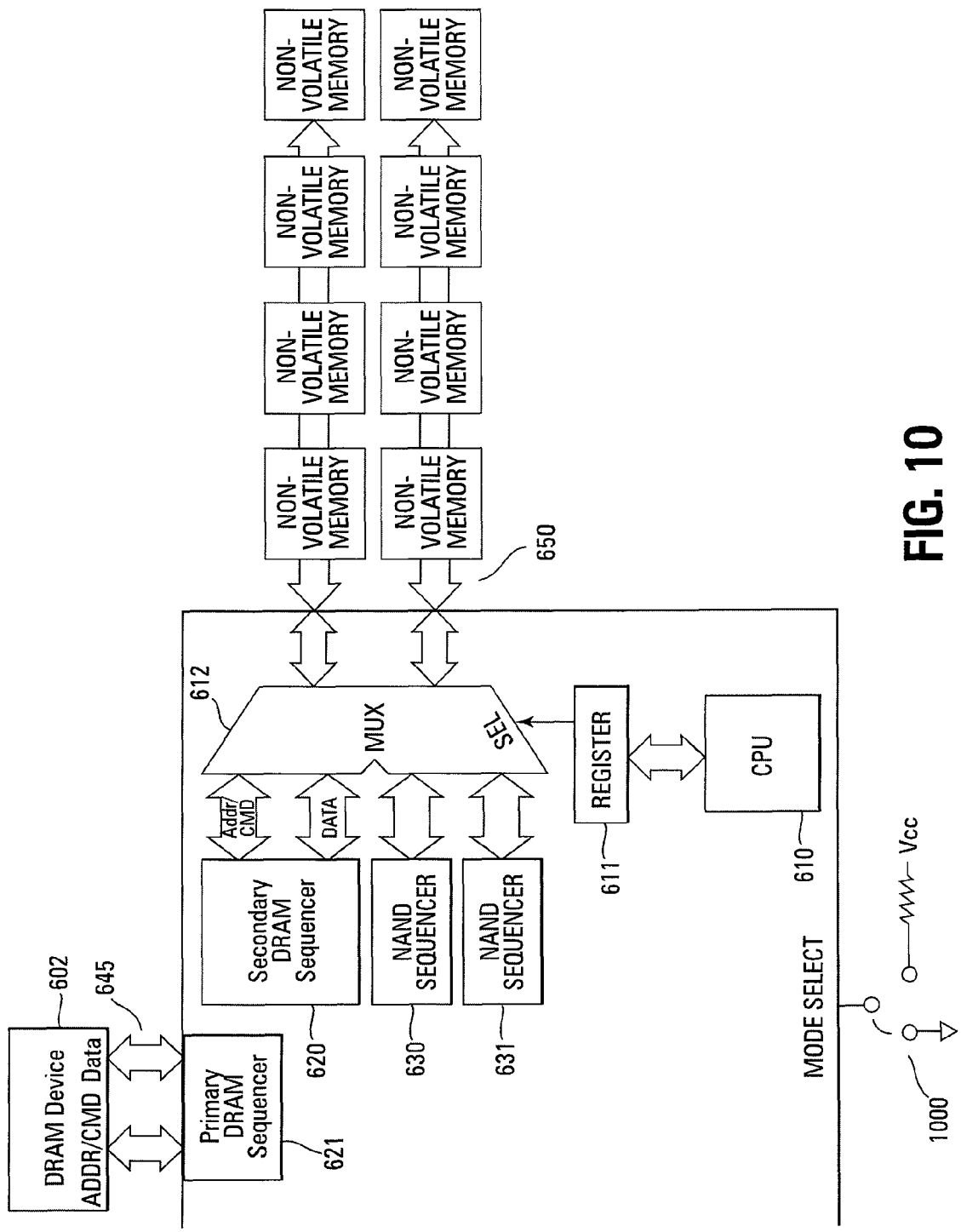
FIG. 10 shows a logical representation of one embodiment of a solid state storage device substantially similar to the embodiment of FIG. 6 and operating in a non-volatile memory mode.

FIG. 10 illustrates a logical block diagram of the embodiment of FIG. 6 but operating in the non-expansion mode (e.g., the non-volatile memory mode) instead of the expansion mode as illustrated in FIG. 6. Each element of the embodiment of FIG. 10 with the same reference number as the element of FIG. 6 provides the same function as that described above with reference to FIG. 6.

In this embodiment, with the non-volatile memory mode selected, the communication channels 650 are dedicated only to the non-volatile memory devices of each channel. The secondary DRAM sequencer 620 is still present but is not being used without the extra expansion DRAM installed.

The selection of the different modes (e.g., DRAM expansion mode; non-volatile memory mode) for the above-described embodiments can be performed by a hardwired mode selection input 1000 for the solid state storage device controller as illustrated in FIG. 10. The mode selection may be done during manufacture of the solid state storage device with a jumper to ground for one mode and a jumper to VCC for the other mode. This allows the manufacturer to make and inventory only one controller that is capable of operating in both modes. Thus, if the DRAM expansion mode is necessary for one embodiment, the expansion DRAM device is installed and the DRAM expansion mode selected by the hardwired input. In an alternate embodiment, the mode can be selected by a command from the CPU in the controller. The CPU may detect the presence of a DRAM and configure the ports appropriately.

Figure 11:
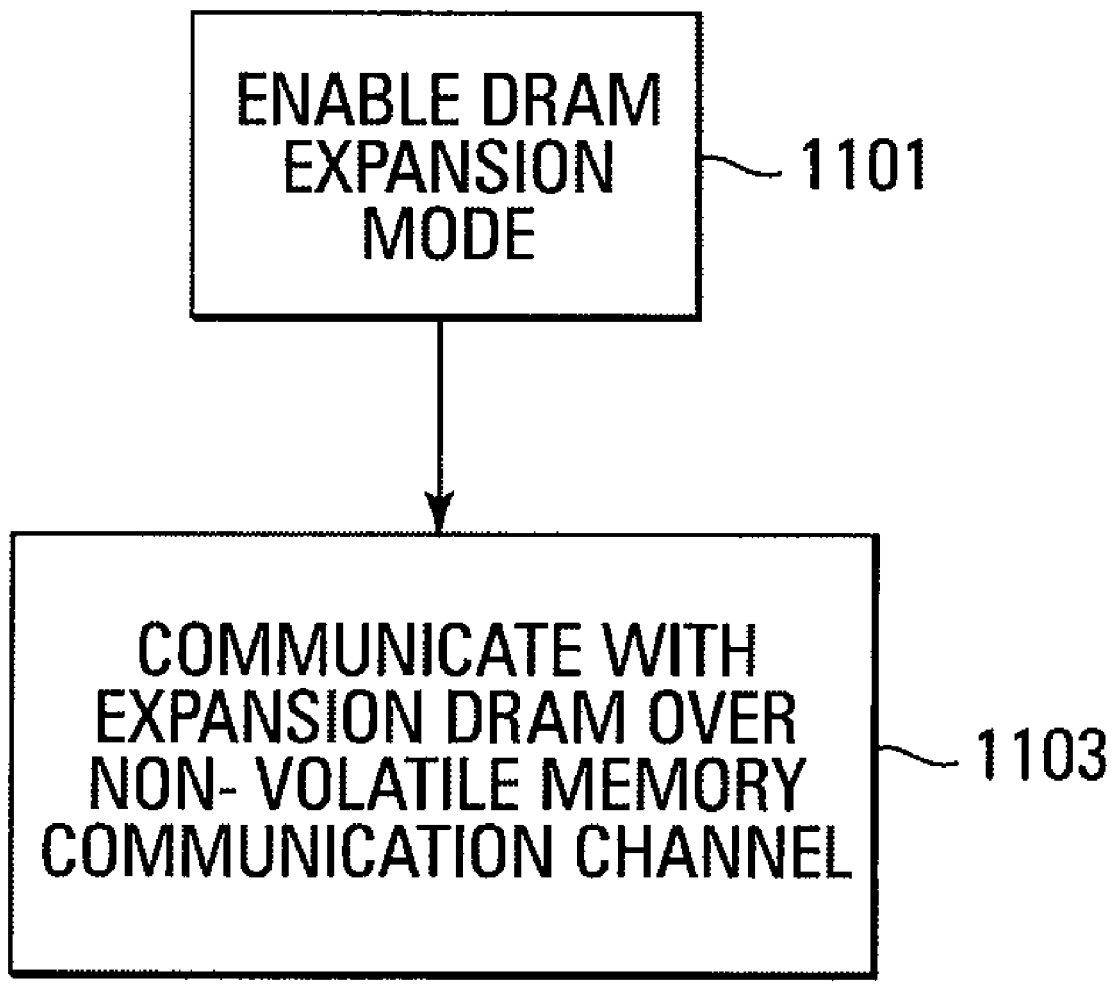
FIG. 11 shows a flowchart of one embodiment of a method of operation of a solid state storage device controller with a DRAM expansion mode.

FIG. 11 illustrates a flowchart of one embodiment of a method of operation of a solid state storage device controller with a DRAM expansion mode. The expansion mode is enabled 1101 either through the hardwired input or the command from a CPU in the controller. The controller then communicates with the expansion DRAM over one or more of the memory communication channels 1103 as described in the embodiments above.

CONCLUSION

In summary, one or more embodiments provide a solid state storage device controller with the capability to operate in both an expansion mode and a non-expansion memory mode. The expansion mode uses one or more memory communication channels, normally used for non-volatile memory communication, to communicate with an expansion DRAM device. The solid state storage device could be a solid state drive (SSD) used in computers to replace the magnetic hard drive.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A solid state storage device controller comprising:
    a primary DRAM sequencer for generating DRAM signals for a primary DRAM;
    a secondary DRAM sequencer for generating DRAM signals for an expansion DRAM;
    at least one non-volatile memory sequencer for generating non-volatile memory signals for a plurality of non-volatile memory devices; and
    a plurality of non-volatile memory communication channels that couple the at least one non-volatile memory sequencer to the plurality of non-volatile memory devices, each communication channel configured to couple a different group of non-volatile memory devices of the plurality of non-volatile memory devices wherein, in response to an expansion mode, at least one of the plurality of non-volatile communication channels couples only the expansion DRAM to the secondary DRAM sequencer; and an interface for coupling the solid state storage device to an external system.

2. The solid state storage device controller of claim 1 wherein the solid state storage device is a solid state drive.

3. The solid state storage device controller of claim 1 wherein the DRAM signals include address signals, data signals, and control signals.

4. The solid state storage device controller of claim 1 wherein the interface is one of parallel ATA, SATA, SAS, PCIe, Fiber Channel, SCSI, Gigabit Ethernet.

5. The solid state storage device controller of claim 1 wherein, in response to the expansion mode, the expansion DRAM is coupled to the secondary DRAM sequencer over two of the plurality of non-volatile memory communication channels.

6. The solid state storage device controller of claim 5 wherein a DRAM address/control bus is coupled over a first of the two non-volatile memory communication channels and a DRAM data bus is coupled over a second of the two non-volatile memory communication channels.

7. A solid state storage device comprising:
a plurality of non-volatile memory devices organized into separate groups of non-volatile memory devices;
a plurality of non-volatile memory communication channels wherein each separate group of non-volatile memory devices is coupled to a different non-volatile memory communication channel;
a primary volatile memory device;
an expansion volatile memory device; and
a solid state storage device controller coupled to the plurality of non-volatile memory devices over the plurality of non-volatile memory communication channels and coupled to the primary volatile memory device through a primary volatile memory control circuit and wherein the controller is coupled to the expansion volatile memory device through at least one of the plurality of non-volatile memory communication channels when the controller is in an expansion mode.

8. The solid state storage device of claim 7 wherein the at least one non-volatile memory communication channel is coupled to a data bus of the expansion volatile memory device.

9. The solid state storage device of claim 8 wherein the expansion volatile memory device shares an address and control bus with the primary volatile memory device.

10. The solid state storage device of claim 7 wherein the expansion volatile memory device is coupled to the controller over two of the plurality of non-volatile memory communication channels when the controller is in the expansion mode.

11. The solid state storage device of claim 7 wherein the controller further comprises a volatile memory sequencer that is coupled to both the primary volatile memory device and the expansion volatile memory device when the controller is in the expansion mode.

12. The solid state storage device of claim 11 wherein the volatile memory sequencer is coupled only to the primary volatile memory device and the plurality of non-volatile memory communication channels are coupled only between the groups of non-volatile memory devices and the controller when the controller is not in the expansion mode.

13. A method for operation of a solid state storage device controller, the method comprising:
enabling an expansion mode in the solid state storage device controller; and
communicating with an expansion volatile memory device over a non-volatile memory communication channel.

14. The method of claim 13 wherein the expansion mode is enabled by one of a hardwired input or a software command.

15. The method of claim 13 wherein communicating with the expansion volatile memory device comprises writing translation tables to the volatile memory device.

* * * * *